June 17, 1941.  M. KLAVIK  2,245,789

FRAME FOR AUTOMOBILES

Filed Sept. 1, 1939

Inventor
Miloš Klavik
By
Singer, Ehlert, Stern & Carlberg
attys.

Patented June 17, 1941

2,245,789

UNITED STATES PATENT OFFICE 2,245,789

FRAME FOR AUTOMOBILES

Miloš Klavík, Prague-Smichov, Czechoslovakia

Application September 1, 1939, Serial No. 293,138
In Czechoslovakia September 1, 1938

4 Claims. (Cl. 280—106)

In those automobiles which comprise frames formed with a central body carrying member with transverse members joined thereto, pressed flat sections are increasingly used in place of tubular body carrying members. Generally U or channel sections are used, which are welded together to form the square-sectioned central carrying member and to the latter the corresponding transverse carrying members are connected. Connection of these members by welding has the disadvantage that the main carrying member is substantially weakened by the heat of the material, this being effected not so much by the longitudinal welding as by the transverse welding.

According to the invention, these disadvantages are obviated by welding the carrying member of channel sections only by longitudinal welding, this being effected by forming the individual U-shaped parts from the pressed channel sections by bending and then connecting them together by welding, so that their central parts form the principal central carrying member and their arms the transverse carrying members.

A constructional example of the invention is shown in the accompanying drawing.

Figure 1:
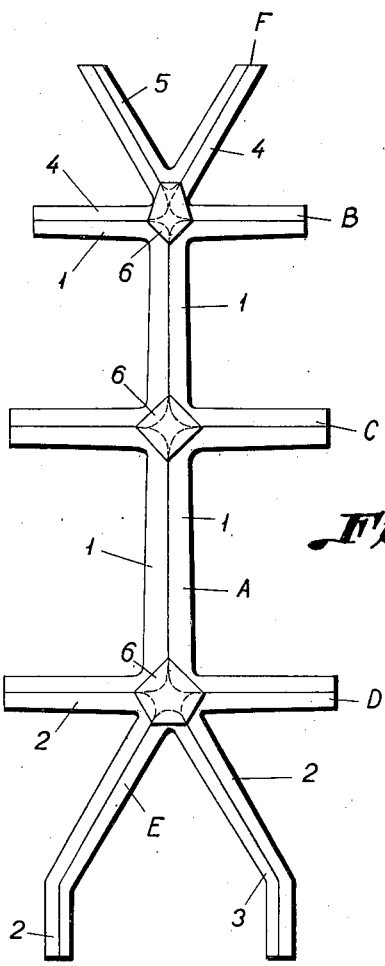
Fig. 1 is a top plan view of a frame.
Figure 2:
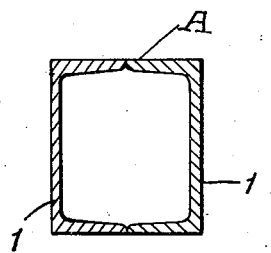
Fig. 2 is a cross-sectional view of the tubular center portion of the same.

The parts 1 pressed from channel sections are bent U-shaped and welded together so as to form the hollow longitudinal carrying member A, the transverse carrying member C and partly the transverse carrying members B and D. Furthermore, the forked engine carrying member E, likewise consisting of channel sections and comprising the suitably bent parts 2 and the inner part 3, is welded on. At the other end, the suitably bent parts 4 and 5 form the fork F for mounting the front shock absorbers. The openings in the joints are covered by the plates 6.

A larger or smaller number of parts 1 may be employed as required, so as to form a larger or smaller number of transverse carrying members.

If desired, the channel sections may also be bent in some other way, according as to whether this is necessary for the transverse carrying members or forks.

I claim:

1. A frame for automobiles composed of a number of members of channel-shaped cross-section, some of said members being U-shaped and welded together so that the bases of the U-shaped members form a tubular center portion of the frame, while the legs of said U-shaped members are forming tubular transverse portions of the frame, other members of said frame being V-shaped and welded to each other and to the outer legs of the U-shaped members at the ends of the frame, so as to complete the tubular shape of the transverse end portions of the frame, and to form a pair of outwardly diverging tubular frame portions at each end of said tubular center portion of the frame.

2. A frame for automobiles composed of a number of members of channel-shaped cross-section, some of said members being U-shaped and welded together so that the bases of the U-shaped members form a tubular center portion of the frame, while the legs positioned at the end of said tubular center portion form one half of tubular transverse portions of the frame, other members of said frame being V-shaped and welded to each other to form two diverging tubular frame portions at each end of said tubular center portion, the outer legs of the outwardly disposed V-shaped members are forming the other half of the tubular transverse portions at the end of said tubular center portion and being welded to the first mentioned half of said transverse portions so as to complete their tubular form.

3. A frame for automobiles composed of a plurality of frame members of U-shaped cross-section, some of said members are bent into the form of a U and are welded together so that the bases of said U-formed members form a longitudinal tubular center portion of the frame, while the legs of the U-formed members are forming tubular transverse portions of said frame, other members of said plurality of frame members being bent into the form of a V and welded to each other and to the outer legs of the U-formed frame members at the ends of the frame, so as to complete the tubular shape of the transverse end portions of the frame and to form a pair of outwardly diverging tubular portions at each end of said tubular center portion of the frame.

4. A frame for automobiles composed of a plurality of frame members of U-shaped cross-section, some of said members are bent into the form of a U and are welded together so that the bases of said U-formed members form a longitudinal tubular center portion of the frame, while the legs of the U-formed members are forming tubular transverse portions of said frame, other members of said plurality of frame members being bent into the form of a V and are welded to each other and to the outer legs of the U-formed frame members at the ends of the frame, so as to complete the tubular shape of the transverse end portions of the frame and to form a pair of outwardly diverging tubular portions at each end of said tubular center portion of the frame, and plates attached to the flanges of the U-shaped frame members to cover the holes formed at the places where each four of said bent frame members meet.

MILOŠ KLAVÍK.